J. R. SNYDER.
AIR BRAKE CONTROL VALVE.
APPLICATION FILED FEB. 13, 1914.

1,212,829.

Patented Jan. 16, 1917.
4 SHEETS—SHEET 1.

WITNESSES

INVENTOR

UNITED STATES PATENT OFFICE.

JACOB RUSH SNYDER, OF PITTSBURGH, PENNSYLVANIA, ASSIGNOR TO PITTSBURGH AIR BRAKE COMPANY, OF PITTSBURGH, PENNSYLVANIA, A CORPORATION OF PENNSYLVANIA.

AIR-BRAKE-CONTROL VALVE.

1,212,829.

Specification of Letters Patent.

Patented Jan. 16, 1917.

Application filed February 13, 1914. Serial No. 818,571.

*To all whom it may concern:*

Be it known that I, JACOB RUSH SNYDER, a resident of Pittsburgh, in the county of Allegheny and State of Pennsylvania, have invented a new and useful Improvement in Air-Brake-Control Valves, of which the following is a specification.

This invention relates to what is known as a passenger car control valve, that is, a valve for use on passenger cars which performs all of the functions of the usual triple valve as well as other functions.

The object of the present invention is to provide valve mechanism of the character described whereby the valves on the front cars of a train are prevented from robbing the train pipe of pressure to such an extent as to prevent the release action of the valves toward the rear end of the train; whereby overreductions in train pipe pressure can be made to secure high service braking power without danger of the valve going to emergency position; whereby a very quick and positive emergency action is secured; as well as a valve mechanism which performs other functions and has other advantages which will hereinafter appear.

In the accompanying drawings Fig. 13 in overreduction lap position, and Fig. 14 in emergency position.

The valve in its general form, construction and arrangement follows the standard Westinghouse and similar triple valves, with certain modifications therein and additions thereto.

It comprises a casing 1 provided at its inner end with a flat face 2 for connection to the auxiliary reservoir and brake cylinder, if desired, and is closed at its opposite end by the head or cap 3. In the casing is the chamber 4 in which works the main piston 5 which is provided with a stem 6 extending into the chamber or bore 7 of the casing and which serves to actuate the slide valves.

The train pipe connection is through a passage 10 extending longitudinally through the bottom portion of the casing 1 and communicating with a passage 11 in the head or cap 3 and which in turn communicates with the piston chamber 4 and with a chamber 13 in the outer portion of the head or cap 3. In the bushing of piston chamber 4 is the usual charging groove 14 which is open when the valve is in normal release and restricted recharging positions, and through which the auxiliary reservoir is charged in the usual way.

Figure 1:
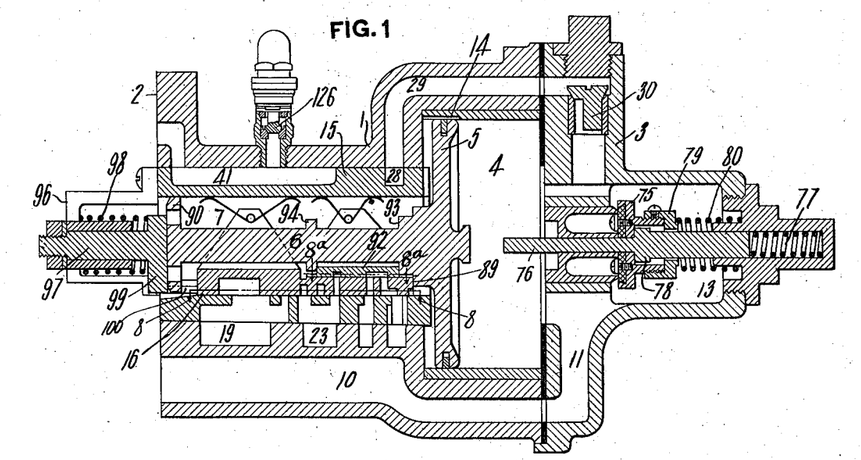
Figure 1 is a longitudinal section through the valve embodying the invention, the section being taken on the line 1—1, Fig. 2, and showing the valve mechanism in normal release or running position.
Figures 2, 16:
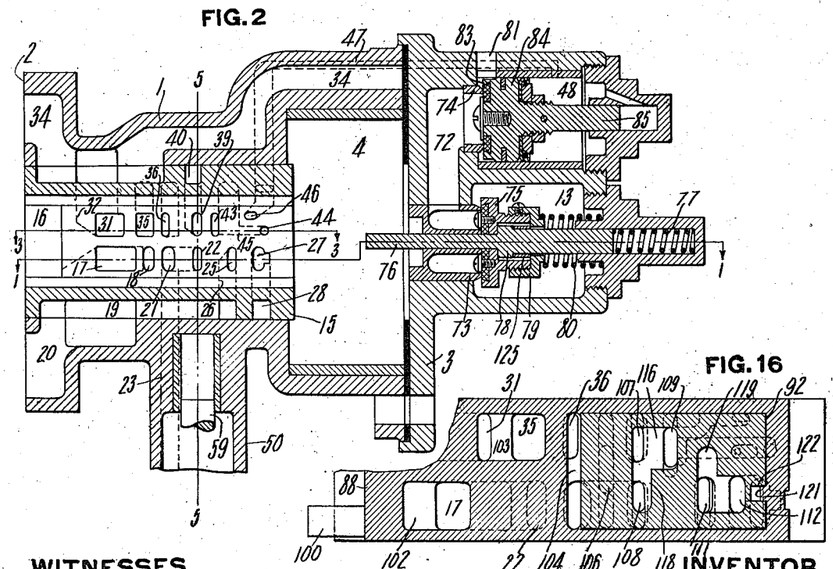
Fig. 2 is a horizontal section through the valve, with the main piston and valves omitted and showing the main valve seat in plan view.
Figs. 16 and 17 are diagrammatic views corresponding to Fig. 9, and illustrating a modification which secures a graduated release of the brakes, Fig. 16 showing the valves in release position and Fig. 17 in graduated release lap position.

In the bore of the valve is a suitable bushing 15 whose lowermost portion forms a valve seat 16 which is provided with the ports and passages shown in Fig. 2, to-wit, a large port 17 and a smaller port 18, both of which communicate with a passage 19 which leads to the longitudinal passage 20 leading to the supplementary reservoir; a pair of ports 21 and 22 which communicate with a passage 23 in the casing and from which a passage leads to the application chamber piston as hereinafter described; a small port 25 which communicates with a transverse passage 26 leading to the supplementary reservoir passage 20; a port 27 which communicates with a passage 28 extending around the bushing and communicating with a cored-out passage 29 in the casing and which opens into a chamber 13 in the head or cap 3 and in which passage is a check valve 30 seating toward the train pipe chamber 13; a port 31 communicating through a cross passage 32 with a longitudinal passage 34 leading to the emergency brake cylinder; a relatively large port 35 and an adjacent smaller port 36, both of which communicate with the atmosphere; a port 39 which communicates with a passage 40 extending partly around the bushing 15 and communicating with a longitudinal passage 41 extending out to the inner face 2 of the valve casing and leading to the application chamber; an oblong port 43 and a small circuit port 44 both communicating with passage 45 leading to the atmosphere; and a small port 46 which communicates with passage 47 leading to chamber 48 in the head or cap 3 behind the emergency vent valve hereinafter described.

Formed on one side of the casing 1 is an extension 50 for the supplementary valve mechanism. In this extension is a chamber 51 in which works the supplementary piston 52. The outer end of this supplementary casing is closed by the head or cap 53 forming on the outer face of the piston 52 a chamber 54, and from which a cored-out passage 55 leads through said supplementary casing 50 and communicates with the passage 23, hereinbefore referred to.

The supplementary casing 50 is provided with a valve seat 56 upon which works a slide valve 57, which is actuated by means of a pin 58 extending upwardly from the stem 59 of the supplementary piston 52, said pin 58 extending through an opening 60 in the valve seat 56. The slide valve 57 is provided with a cavity 61 adapted in normal position to connect opening 60 in the valve seat with port 62 in the valve seat which communicates with passage 63 leading to the atmosphere. The slide valve 57 operates in a chamber 64 formed by the casing cap 65, and said chamber communicates through opening 66 with the supplementary reservoir passage 19. The piston chamber 51, as well as the port 60 in the supplementary valve seat, communicates through passage 68 with a longitudinal passage 69 in the casing 1 and leading out to the inner face 2 of said casing and having connection to the service brake cylinder.

In the head or cap 3 is a passage 72 which communicates at one end with an opening through the emergency valve seat 73 and at its opposite end with an opening through the emergency vent valve seat 74. The emergency valve seat 73 communicates with the train pipe chamber 13 in the head or cap 3 and this communication is controlled by the emergency valve 75 which loosely surrounds the graduating stem 76 which is slidably mounted in the head or cap 3 and projects into the main piston chamber 4. The outer end of the graduating stem abuts against a spring 77 in the outer closure of the head or cap 3. Said stem is provided with a collar or enlargement 78 which when the valve is in normal or release position abuts against the outer face of the emergency valve 75 and assists in holding said valve to its seat, and when said graduating stem is pushed sufficiently far outwardly said collar or enlargement abuts against the inner face of a sleeve 79 carried by the emergency valve and will unseat said emergency valve, moving the same against the pressure of supplementary compression spring 80.

Figures 3, 7:
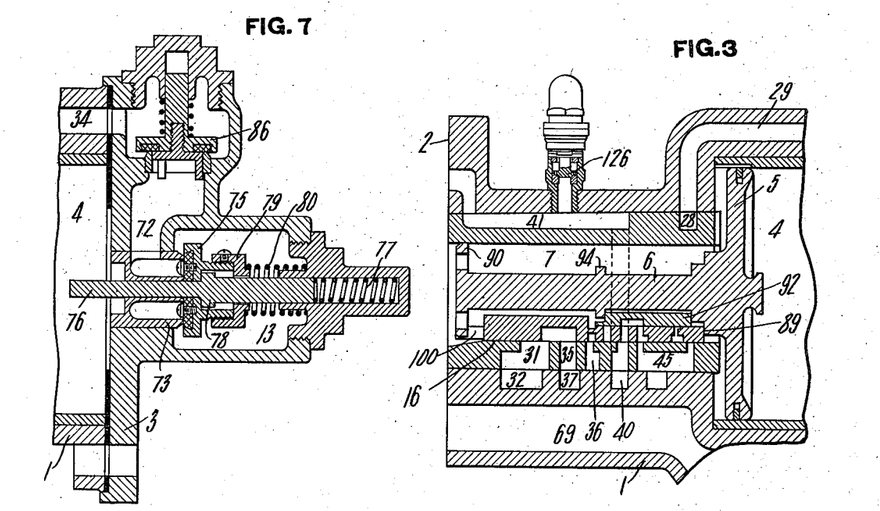
Fig. 3 is a longitudinal section similar to Fig. 1 taken on the line 3—3, Fig. 2.
Fig. 7 is a section corresponding to Fig. 2 and showing a modified arrangement in the head of the valve casing.
Figure 4:
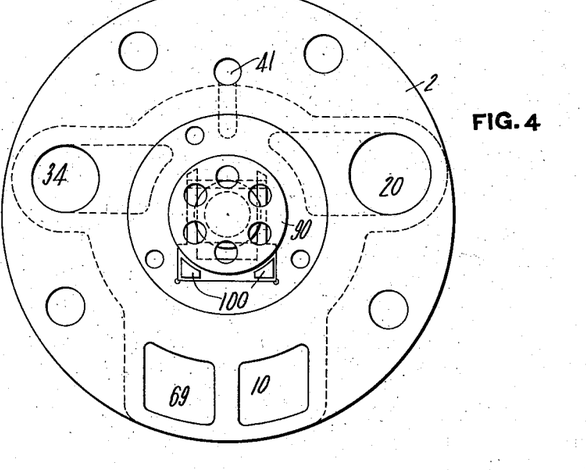
Fig. 4 is an end view of the valve casing, the supplementary valve casing being omitted.

The vent valve seat 74 communicates either with the atmosphere through exhaust port 81, as shown in Fig. 2, or with the emergency brake cylinder passage 34, as shown in Fig. 7. As shown in Fig. 2, the communication between the passage 72 and the exhaust port 81 is controlled by a valve 83 formed on the inner face of piston 84 which works in the chamber hereinbefore referred to and is provided with a guiding stem 85. As shown in Fig. 7, the communication between the passage 72 and emergency brake cylinder passage 34 is controlled by a check valve 86 spring-seated toward the train pipe.

Coöperating with the main valve seat 16 is a main slide valve 88 which is held between the shoulder 89 on the main piston 5 and a collar 90 on the outer end of the piston stem 6, but does not completely fill the space between said shoulder and collar so that the main piston has a limited movement without moving the main slide valve. One end of this main piston forms a seat for the graduating slide valve 92, which is held between shoulder 93 and collar 94 on the main piston stem 6, and entirely fills the space between said shoulder and collar so that it moves at all times with the main piston. Secured to the face 2 of the valve casing is a yoke 96 which forms a guide for a plunger 97 longitudinally movable in said yoke and normally pressed inwardly by means of compression spring 98. The plunger on its inner end is provided with a head 99 which is adapted to abut against projections or prongs 100 on the main slide valve 88 for the purpose of returning this main slide valve from the restricted recharging position hereinafter described to normal release and recharging position.

Figures 8, 9, 10, 11, 12, 13, 14, 15:
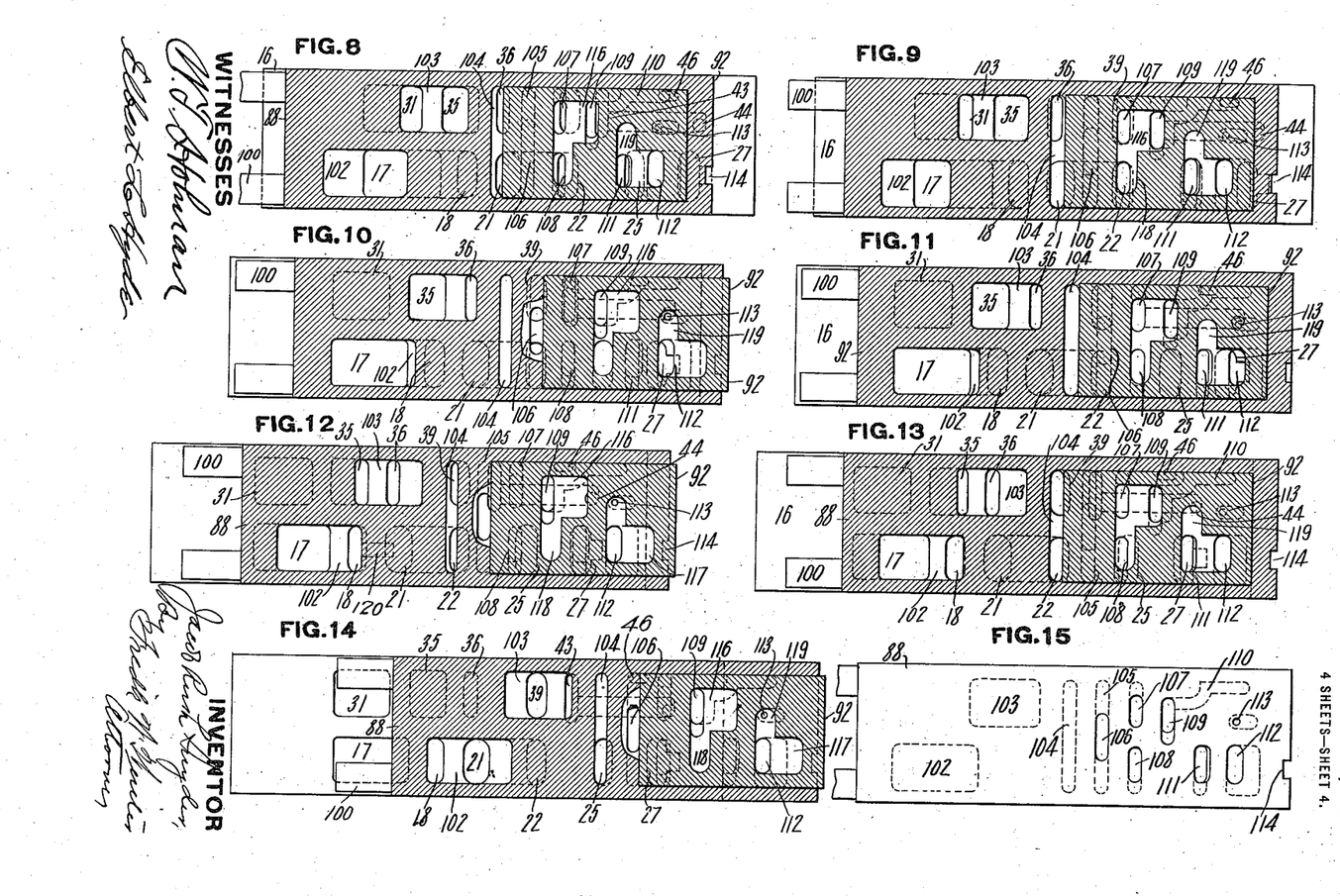
Figs. 8, 9, 10, 11, 12, 13 and 14 are diagrammatic views showing the valve seat in plan and the main valve in horizontal section on the line 8—8, Fig. 1, and showing the graduating valve in horizontal section on the line 8ª—8ª, Fig. 1, and showing different positions of the main valve,—Fig. 8 showing the same in restricted recharging position, Fig. 9 in normal release and recharging position, Fig. 10 in service application position, Fig. 11 in service lap position, Fig. 12 in overreduction position, and in dotted lines indicating a modification.
Fig. 15 is a top plan view of the main slide valve.

The main slide valve 88 is provided with the cavities and ports shown in Fig. 15, to-wit:—A large cavity 102 near the inner end of said valve on one side of the longitudinal center thereof; another large cavity 103 somewhat farther outwardly on said valve and on the opposite side of its longitudinal center; a narrow transverse cavity 104 extending nearly from side to side of said valve; and a similar narrow transverse cavity 105 which, however, opens through the top face of said valve by means of an oblong port 106. A pair of oblong ports 107 and 108 transversely in line with each other and located on opposite sides of the longitudinal center of said valve and elongated on the bottom face of the valve; an oblong port 109 extending entirely through the valve and having its lower end communicating with a cavity 110 extending toward the outer end of said valve; a pair of oblong ports 111 and 112 adjacent to each other near the outer end of the valve and both extending entirely through the valve, and both enlarged on their lower ends; and a small port 113 near the outer end of the valve and extending entirely through the same and being materially enlarged at its lower end. The outer end of the valve is also cut away at its lower corner, as shown at 114.

The graduating valve is provided on its lower face with a pair of large substantially rectangular cavities 116 and 117, each provided with a transversely extending projection marked 118 and 119 respectively.

Figure 5:
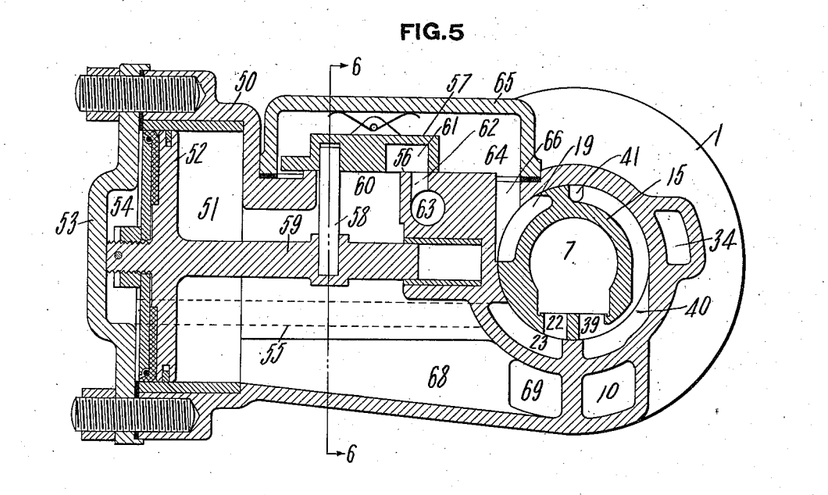
Fig. 5 is a transverse view taken on the line 5—5, Fig. 2, and showing the supplementary valve.
Figure 6:
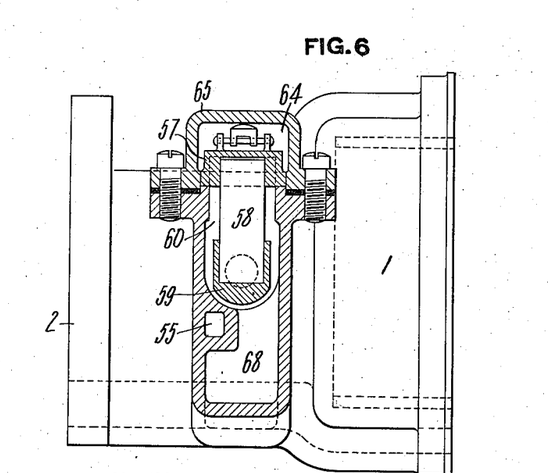
Fig. 6 is a section taken on the line 6—6, Fig. 5.

The valve mechanism described has seven positions, as follows:

*1. Restricted recharging position.* (Shown in Fig. 8.)—This position is assumed by the valves on the forward end of the train, due to a sudden increase in train pipe pressure to release the brakes, which drives the piston 5 completely inwardly, compressing spring 98 and moving the valves to the position shown in Fig. 8. In this position the emergency brake cylinder port 31 is connected to exhaust port 35 by cavity 103 in the main slide valve, thus exhausting the emergency brake cylinder. The cavity 104 in the slide valve also connects exhaust port 36 with the port 21, which as heretofore described communicates through passages 23 and 55 to the chamber 54 on the outer side of the supplemental piston 52. Consequently, said piston moves outwardly carrying with it the slide valve 57 to the position shown in Fig. 5, in which the service brake cylinder passage, 69, 68, is connected to exhaust port 62, thus also exhausting the service brake cylinder. The train pipe port 27 is slightly overlapped by the port 112 in the main slide valve, and the supplementary reservoir port 25 is partly overlapped by the port 111 of the main slide valve, while the cavity 117 of the graduating valve connects ports 111 and 112, thereby permitting train pipe air to flow past the check valve 30 through passage 29 through port 27, slide valve port 112, graduating valve cavity 117, slide valve port 111 to supplementary reservoir port 25. The main slide valve, however, opens merely a slit of train pipe port 27 and hence the supplementary reservoir receives only a very small amount of air so that it is not able to rob the train pipe to such an extent as to prevent sufficient air from flowing to the rear of the train to move the valves there to release position. The auxiliary reservoir in this position is charged through feed groove 15, and also from the train pipe port 27 through the cut-away portion 114 in the end of the main slide valve, but the auxiliary reservoir in this system will only be a small chamber. The auxiliary reservoir, however, feeds up much more rapidly than the supplementary reservoir, and consequently pressure is built up fairly rapidly on the inner face of main piston 5, and when this reaches a certain value it, together with compression spring 98 acting on plunger 97, moves the main piston and valves slightly outwardly, or to position number 2. The head 99 of plunger 97 not only acts against the stem 6 of piston 5 but also against the projections 100 on the main slide valve 88, thereby insuring the movement of the main slide valve as well as the graduating valve to position number 2.

*2. Full release position.* (Shown in Figs. 1, 3, 5 and 9.)—This is the normal release and running position of the valve, and is the position assumed by the valves on the rear end of the train upon release of the brakes, and of the valves on the forward end of the train after movements just described in connection with position number 1. In this position the former exhaust connections for the emergency brake cylinder and service brake cylinders are maintained, the connection between the brake pipe port 27 and supplementary reservoir port 25 is increased so that now the supplementary reservoir is quickly charged, the auxiliary reservoir feed groove 14 is still open, but the connection of notch 114 with train pipe port 27 is broken, so that the auxiliary reservoir now is being recharged more slowly than in the previous position. In normal release position (and also in restricted recharging position) the application chamber port 39 is lapped by port 107 on the main slide valve, while exhaust port 43 is lapped by port 109 on the main slide valve, and ports 107 and 109 are connected through the cavity 116 of the graduating valve. Consequently the application chamber is exhausted to the atmosphere. In normal release position (and also in restricted recharging, service and service lap positions) the emergency vent valve port 46 is connected by cavity 110 in the main slide valve to exhaust port 43. Consequently, the chamber 48 on the outer face of the emergency vent valve piston 84 is exhausted, but inasmuch as the emergency valve 75 is also closed no air flows from the train pipe through the emergency vent valve.

*3. Service position.* (Shown in Fig. 10.)—This position is assumed upon gradual reductions in train pipe pressure, which cause the main piston 5 to move outwardly until it contacts with the graduating stem 76, when it stops. The first effect of this movement is to move the graduating valve 92 on the main slide valve, and then move both valves to the position shown in Fig. 10. In this position the port 112 on the main slide valve overlaps train pipe port 27 and is in turn overlapped by the cavity 117 in the graduating valve, whose extension 119 overlaps port 113 in the slide valve which is in communication at its lower end with the exhaust port 44 in the valve seat. Consequently train pipe pressure is vented to the atmosphere in order to reduce train pipe pressure at the car and secure a quick serial action of the brakes throughout the train. The graduating valve has uncovered the upper end of port 106 through the main slide valve, whose lower end overlaps both the application chamber port 39 and the port 22, the latter of which communicates through passages 23 with the chamber 54 on the outer side of piston 52. Consequently auxiliary reservoir pressure flows to the application chamber and to chamber 54 and the supplementary valve is moved to the right, viewing Fig. 5, breaking connection between the service brake cylinder and the exhaust port 62, and opens communication between chamber 64 and chamber 68, as a consequence of which supplementary reservoir pressure coming by way of passage 20 and port 66 flows through port 60 and passages 68 and 69 to the service brake cylinder. When auxiliary reservoir pressure is reduced to an amount equal to the reduction in train pipe pressure, or slightly less, the main valve will lap back to the position next to be described.

*4. Service lap position.* (Shown in Fig. 11.)—This is the position to which the valve moves after a service application as soon as auxiliary reservoir pressure is reduced slightly below the point to which train pipe pressure has been reduced. In moving back only the graduating valve moves, until it covers the port 106 on the main slide valve, thus cutting off communication between the auxiliary reservoir and the application chamber and the chamber 54 of the supplementary valve. In this position supplementary piston 52 is acted upon on its outer face by the pressure in the service brake cylinder. Consequently, as soon as brake cylinder pressure exceeds the trapped pressure in chamber 54 the supplementary valve mechanism moves to the left, viewing Fig. 5, cutting off communication between the supplementary reservoir and the service brake cylinder, but not sufficiently far to open the exhaust 62. Should there be a leak of brake cylinder pressure, this reduces the pressure on the inner face of supplementary piston 52, whereupon the preponderance of pressure in chamber 54 again moves the supplementary valve mechanism to the right to allow more pressure to pass from the supplementary reservoir to the service brake cylinder, and as soon as this is again equal or slightly in excess of pressure in chamber 54 the supplementary valve will lap back as above described. The supplementary valve, therefore, serves to maintain the brake cylinder pressure uniform irrespective of brake cylinder leakage or variation in piston travel. By successively reducing train pipe pressure the service application pressure can be increased as desired, and in all positions of service application or service lap position the supplementary valve maintains the brake cylinder pressure.

*5. Overreduction position.* (Shown in Fig. 12.)—This position is assumed by the valve mechanism when the train pipe pressure has been reduced to such point that the auxiliary reservoir equalizes with the application chamber (and consequently with the service brake cylinder). This results in moving the entire valve mechanism slightly farther to the right, until the cavity 104 in the main slide valve connects application chamber port 39 with the port 22 communicating with the chamber 54 in the supplementary valve, thereby maintaining connection between the application chamber and the chamber 54 on the outer face of the supplementary piston. This is to give sufficient volume to said chamber 54 so that the pressure in the same will not be materially affected by slight leakage, should any occur. Should it be desired to secure a greater braking pressure in this position of the valve, provision can be made for admitting supplementary reservoir pressure to said chamber 54, which can be done by providing in the lower face of the main slide valve a small groove (shown in dotted line at 120, Fig. 12) which will connect the application chamber port 21 to the supplementary reservoir port 18. In this position the graduating stem 76 is pushed outwardly, compressing spring 77, until the shoulder 78 on said stem abuts against the sleeve 79, whereupon the resistance of spring 80 is encountered and further outward movement of the piston ordinarily ceases. To prevent the valve from moving to emergency position when this occurs the port 106 which has been uncovered by the graduating valve is brought into such position that it very slightly overlaps exhaust port 43. Consequently auxiliary reservoir pressure is exhausted to the atmosphere sufficiently to reduce the pressure on the inner face of the main piston 5 so that the main piston will not move any farther outwardly, or toward emergency position, but on the contrary will lap back to the position now to be described.

6. *Overreducstion lap position.* (Shown in Fig. 13.)—In this position the main piston after the reduction of auxiliary reservoir pressure as just described moves back until the graduating valve covers the port 106 in the main slide valve and stops the further venting of auxiliary reservoir pressure to the atmosphere, while at the same time the cavity 104 in the main slide valve continues to connect the ports 39 and 22, as above described. In overreduction position the supplementary valve supplies air from the supplementary reservoir to the service brake cylinder, and maintains service brake cylinder pressure, exactly as in service position.

7. *Emergency position.* (Shown in Fig. 14.)—This position is assumed upon a sudden large reduction in train pipe pressure which causes the main piston to move outwardly, compressing both springs 77 and 80, and causing the shoulder 78 on the graduating stem to unseat the emergency valve 75. This allows the train pipe pressure to rush from chamber 13 into passage 72, whence it will unseat the vent valve 84, and either escape to the atmosphere through exhaust 81, as in Fig. 2, or flow through passage 34 to the emergency brake cylinder. This secures the necessary reduction of train pipe pressure at each car to insure the quick serial action of the brakes throughout the train. The slide valves assume the position shown in Fig. 14, in which emergency brake cylinder port 31 and supplementary reservoir port 17 are uncovered, thereby allowing supplementary reservoir pressure to flow directly to the emergency brake cylinder. Cavity 102 in the main slide valve also connects supplementary reservoir port 18 with port 21, also allowing supplementary reservoir pressure to flow through passages 23 and 55 to the chamber 54 on the outer face of the supplementary piston. This produces a very quick movement of the supplemental piston, moving the supplementary valve 57 to establish communication between the supplementary reservoir and the service brake cylinder, as hereinbefore described. Application chamber port 39 is connected through cavity 103 in the main slide valve with exhaust port 43, thereby exhausting the application chamber. It will be recalled that in normal release position the chamber 48 behind the vent valve piston 84 is open to the atmosphere through port 46, cavity 110 and exhaust port 43. This readily permits the train pipe pressure to open the vent valve 83 as soon as the emergency valve 75 is kicked open. When the valve mechanism is fully in emergency position the port 106 in the main slide valve overlaps the port 46, and as the port 106 is uncovered by the graduating valve, auxiliary reservoir pressure flows through port 46 and passage 47 to the chamber 48 behind the piston 84, thereby closing the vent valve 83 as soon as the pressure in chamber 48 has built up to slightly overbalance train pipe pressure. This function applies to the modification shown in Fig. 2. In the modification shown in Fig. 7 the port 46 in the valve seat is not necessary, and in this case the train pipe pressure when the emergency valve 75 is kicked open simply lifts the check valve 86 and flows to the emergency brake cylinder until the tension in the latter plus the tension in the check valve 86 overcomes train pipe pressure when said check valve will seat.

With the valve mechanism described the auxiliary reservoir is a very small chamber and is not depended upon for supplying any material braking pressure in the brake cylinder, but merely for supplying the application chamber. The service brake cylinder is supplied with air from the supplementary reservoir only in all positions of the valve. In service application the auxiliary reservoir supplies the application chamber and also the chamber 54 on the outer face of piston 52. In overreduction position the auxiliary reservoir is vented to the atmosphere. In emergency position both the auxiliary reservoir and the supplementary reservoir are connected to the emergency brake cylinder, while the supplementary reservoir is also connected to the chamber 54 to secure a very quick action of the supplementary valve.

Figure 17:
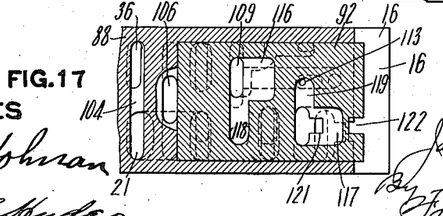

Figs. 16 and 17 show a modification for securing a graduated release of the brakes. When this is desired the exhaust port 36 is omitted or plugged, and hence in both restricted release and normal release positions the exhaust from the application chamber, application chamber port 39 and application chamber piston port 22 is effected through cavity 116 in the graduating valve, connecting these ports to exhaust port 43. The port 112 in the end of the main slide valve has a longitudinal extension 121, so that it laps over the train pipe port 27, and the end of the graduating valve is provided with a cut-away portion 122, which laps over the extension 121 of port 112. Upon a light quick increase in train pipe pressure insufficient for special charging work the main piston moves over, carrying the valves to the position shown in Fig. 16, thereby admitting air from the supplementary reservoir to the auxiliary reservoir through the port 25, port 111 in the main slide valve, cavity 117 in the graduating slide valve, port 112, extension 121, and cut-away portion 122 of the graduating slide valve. In this position chamber 54 of the supplementary valve mechanism is open to exhaust and the supplementary valve mechanism moves to the position shown in Fig. 5, thereby opening the service brake cylinder to exhaust. The auxiliary reservoir is of small capacity with respect to the supplementary reservoir, so that auxiliary reservoir pressure builds up rapidly and when it is slightly greater than the reduced train pipe pressure, the main piston moves over and moves the graduating slide valve back to the position shown in Fig. 17, thereby breaking the connection between the application chamber port 39 and application chamber piston port 22 and exhaust. The supplementary valve mechanism thereupon moves over and breaks connection between the service brake cylinder and exhaust. In this position of the valve the supplementary valve mechanism is effective to maintain the reduced brake cylinder pressure in the manner hereinbefore described. By successive light and quick increases in train pipe pressure the brake cylinder pressure may be reduced step by step to secure a graduated release of the brakes. In case the increase in train pipe pressure is continuous, the main piston moves over as before, but the train pipe pressure builds up more rapidly than the auxiliary reservoir pressure, so that the valve remains in full release position, shown in Fig. 16, and does not lap back to the graduated release lap position shown in Fig. 17.

In case it should be desired to connect the train pipe to the emergency brake cylinders in the position corresponding to overreduction position, the lost motion connection between the emergency stem 76 and the emergency valve 75 can be dispensed with. This can be very readily accomplished by inserting a loose collar 125, shown in dotted lines in Fig. 2, in the space between the shoulder or collar 78 on the graduating stem and the sleeve 79. Consequently, as soon as the main piston moves outwardly sufficiently to compress both springs 77 and 80, even slightly, communication will be established between the train pipe and the brake cylinder.

The valve may also be equipped with suitable devices for limiting the maximum pressure in the brake cylinder. In the form shown in the drawings this comprises a blow-down valve 126 of any suitable or preferred construction, and which communicates with the application chamber 54. Said blow-down valve is shown as connected to the passage 41 between port 39 in the valve seat and the application chamber. This valve is set or adjusted to limit the pressure in the application chamber to a value which produces the desired maximum pressure in the brake cylinder. The brake cylinder pressure is always a function of the pressure in the application chamber 54, so that regulation of the pressure in the pressure chamber also regulates the brake cylinder pressure. On all service reductions in train pipe pressure, pressure is supplied to the application chamber, but if the latter is charged too heavily the excess air passes off to the atmosphere through the blow-down valve. In emergency position, as before described, the application chamber is open to exhaust and the brake cylinders are supplied directly from the train pipe, auxiliary reservoir, and supplementary reservoir, so that the blow-down valve is cut out of action and there is no limit to the maximum braking effect. This arrangement has the advantage that the brake cylinder pressure is limited in service applications without unnecessary waste of air. The application chamber is of small capacity and even if charged too heavily the excess air exhausts through the blow-down valve without wasting the quantity of air which must be exhausted to properly reduce the pressure when the blow-down valve is connected directly to the brake cylinder or to any other large chamber connected thereto.

What I claim is:

1. An air brake valve having connections to the train pipe, brake cylinder, atmosphere, a supplementary reservoir, and an auxiliary reservoir, valve mechanism controlling connections from the train pipe to both of said reservoirs and arranged on an increase of train pipe pressure to restrict the connection from the train pipe to the supplementary reservoir and increase the connection from the train pipe to the auxiliary reservoir, and yielding means for moving said valve to increase the connection from the train pipe to the supplementary reservoir and restrict the connection from the train pipe to the auxiliary reservoir.

2. Air brake valve mechanism having connections to the train pipe, brake cylinder, atmosphere, auxiliary reservoir, and a supplementary reservoir, a movable abutment operating under variations in train pipe pressure and controlling a feeding groove from the train pipe to the auxiliary reservoir, a valve operated by said movable abutment and controlling connections from the train pipe to both the supplementary and the auxiliary reservoir and arranged on increase in train pipe pressure to restrict the connection from the train pipe to the supplementary reservoir and open a connection from the train pipe to the auxiliary reservoir, and yielding means to move said valve and increase the connection from the train pipe to the supplementary reservoir and reduce the connection from the train pipe to the auxiliary reservoir.

3. Air brake valve mechanism having connections to the train pipe, brake cylinder, atmosphere, an auxiliary reservoir and a supplementary reservoir, valve mechanism controlling connections from the train pipe and arranged on increase of train pipe pressure to connect the train pipe to the supplementary reservoir through a restricted connection in said valve mechanism, and yielding means for moving said valve to increase the connection from the train pipe to the supplementary reservoir.

4. An air brake valve mechanism having connections to the train pipe, atmosphere, brake cylinder, and a reservoir, a movable abutment operating under variations of train pipe pressure, a graduating stem adapted to be contacted by said movable abutment, a graduating spring acting against said graduating stem, and a second spring arranged to resist the movement of said graduating stem after a predetermined movement of the latter, and a valve actuated by said movable abutment and arranged in service reductions to establish communication from the reservoir to the brake cylinder, and upon greater reductions to establish communication from the reservoir to the brake cylinder and vent pressure from the reservoir side of said piston, said graduating stem and springs being arranged under service reductions in pressure to move against the resistance of one of said springs, and in further reductions in train pipe pressure to encounter the resistance of the second spring.

5. An air brake valve mechanism having connections to the train pipe, atmosphere, a brake cylinder, an auxiliary reservoir and a supplementary reservoir, a movable abutment actuated by variations in train pipe pressure, and a valve actuated by said movable abutment and controlling ports arranged whereby upon increase in train pipe pressure communication is established from the train pipe to the auxiliary reservoir and to the supplementary reservoir, and yielding means for moving said valve to break the connection from the train pipe to the auxiliary reservoir and to increase the communication from the train pipe to the supplementary reservoir.

6. An air brake valve having connections to the train pipe, the atmosphere, the brake cylinder, a reservoir, and a pressure chamber, a movable abutment actuated by variations in train pipe pressure and arranged to control the supply of air to the pressure chamber, supplementary valve mechanism controlled by the pressure in said pressure chamber and arranged to control communication between said reservoir and the brake cylinder and between the brake cylinder and exhaust, and a blow-down valve in direct communication with said pressure chamber and arranged to limit the maximum pressure in the brake cylinder.

7. An air brake valve having connections to the train pipe, the atmosphere, the brake cylinder, a reservoir, and a pressure chamber, a movable abutment actuated by variations in train pipe pressure and arranged on service reductions in train pipe pressure to open communication between said pressure chamber and a source of pressure, and in emergency position to open communication between said pressure chamber and exhaust, supplementary valve mechanism controlled by the pressure in said pressure chamber and arranged to control communication between said reservoir and the brake cylinder and between the brake cylinder and exhaust, and a blow-down valve in communication with said pressure chamber and arranged to limit the maximum pressure in the brake cylinder on service applications of the brakes.

8. An air brake valve having connection to the train pipe, the atmosphere, the brake cylinder, an auxiliary reservoir, a supplementary reservoir, and a pressure chamber, a movable abutment actuated by variations in train pipe pressure and arranged to control communication between the auxiliary reservoir and pressure chamber, supplementary valve mechanism controlled by the pressure in said pressure chamber and arranged to control communication between the supplementary reservoir and brake cylinder and between the brake cylinder and exhaust, and a blow-down valve in direct communication with said pressure chamber and arranged to limit the maximum pressure in the brake cylinder.

9. An air brake valve having connection to the train pipe, the atmosphere, the brake cylinder, an auxiliary reservoir, a supplementary reservoir, and a pressure chamber, a movable abutment actuated by variations in train pipe pressure and arranged on service reductions in train pipe pressure to connect the auxiliary reservoir to the pressure chamber, and in emergency position to open communication between said pressure chamber and exhaust, supplementary valve mechanism controlled by the pressure in said pressure chamber and arranged to control communication between the supplementary reservoir and the brake cylinder and between the brake cylinder and exhaust, and a blow-down valve in communication with the pressure chamber and arranged to limit the maximum pressure in the brake cylinder in service applications of the brakes.

10. Air brake valve mechanism having connections to the train pipe, brake cylinder, atmosphere, an auxiliary reservoir and a supplementary reservoir, a valve controlling connections from the train pipe to the reservoirs, and a movable abutment operated by an increase of train pipe pressure for moving the valve to restrict the connection from the train pipe to the supplementary reservoir and to open a quick charging connection between the train pipe and auxiliary reservoir.

11. Air brake valve mechanism having connections to the train pipe, brake cylinder, atmosphere, an auxiliary reservoir and a supplementary reservoir, a valve controlling connections from the train pipe to the reservoirs, a movable abutment operated by an increase of train pipe pressure for moving the valve to restrict the connection from the train pipe to the supplementary reservoir and to open a quick charging connection between the train pipe and auxiliary reservoir, and yielding means for moving said valve to establish normal connections from the train pipe to the supplementary reservoir.

12. Air brake valve mechanism having connections to the train pipe, brake cylinder, atmosphere, an auxiliary reservoir and a supplementary reservoir, a valve controlling connections from the train pipe to the reservoirs, and a movable abutment operated by an increase of train pipe pressure for moving the valve to restrict the connection from the train pipe to the supplementary reservoir and to open a quick charging connection between the train pipe and auxiliary reservoir, said valve being arranged upon equalization of train pipe and auxiliary reservoir pressures to assume a position in which the quick charging connection for the auxiliary reservoir is closed.

13. Air brake valve mechanism having connections to the train pipe, brake cylinder, atmosphere, an auxiliary reservoir and a supplementary reservoir, a valve controlling connections from the train pipe to the reservoirs, a movable abutment operated by an increase of train pipe pressure for moving the valve to restrict the connection from the train pipe to the supplementary reservoir and to open a quick charging connection between the train pipe and auxiliary reservoir, said valve being arranged upon equalization of train pipe and auxiliary reservoir pressures to assume a position in which the quick charging connection for the auxiliary reservoir is closed, and yielding means for moving said valve to establish normal connections from the train pipe to the supplementary reservoir.

14. An air brake valve mechanism having connections to the train pipe, brake cylinder, atmosphere, an auxiliary reservoir, a supplementary reservoir, and a pressure chamber, a valve controlling connections from the train pipe to the reservoirs and from the auxiliary reservoir to the pressure chamber, supplementary valve mechanism controlled by the pressure in said pressure chamber and arranged to control communication between the supplementary reservoir and brake cylinder and from the brake cylinder to exhaust, and a movable abutment operated by an increase of train pipe pressure for moving said valve to open a quick charging connection between the train pipe and auxiliary reservoir and open the pressure chamber to exhaust and thereby cause the supplementary valve mechanism to open the brake cylinder exhaust.

15. An air brake valve mechanism having connections to the train pipe, brake cylinder, atmosphere, an auxiliary reservoir, a supplementary reservoir, and a pressure chamber, a valve controlling connections from the train pipe to the reservoirs and from the auxiliary reservoir to the pressure chamber, supplementary valve mechanism controlled by the pressure in said pressure chamber and arranged to control communication between the supplementary reservoir and brake cylinder and from the brake cylinder to exhaust, and a movable abutment operated by an increase of train pipe pressure for moving said valve to open a quick charging connection between the train pipe and auxiliary reservoir and connect the pressure chamber to exhaust and thereby cause the supplementary valve mechanism to open the brake cylinder exhaust, said movable abutment being arranged upon equalization of auxiliary reservoir and train pipe pressures to move said valve to cut off the quick charging connection.

In testimony whereof, I have hereunto set my hand.

JACOB RUSH SNYDER.

Witnesses:
ELBERT L. HYDE,
GLENN H. LERESCHE.